US010154139B2

United States Patent
Sampath et al.

(10) Patent No.: US 10,154,139 B2
(45) Date of Patent: Dec. 11, 2018

(54) QUALITY ANALYSIS OF MEDIA AT CONTACT CENTERS

(71) Applicant: Cisco Technology, Inc., San Jose, CA (US)

(72) Inventors: Sathish Kumar Sampath, Boxborough, MA (US); Srilakshmi Ramakrishnan, Boxborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 295 days.

(21) Appl. No.: 14/941,694

(22) Filed: Nov. 16, 2015

(65) Prior Publication Data

US 2017/0142257 A1 May 18, 2017

(51) Int. Cl.
*H04M 3/51* (2006.01)
*H04L 12/725* (2013.01)
*H04M 3/22* (2006.01)

(52) U.S. Cl.
CPC ........ *H04M 3/5191* (2013.01); *H04L 45/302* (2013.01); *H04L 45/3065* (2013.01); *H04M 3/2227* (2013.01)

(58) Field of Classification Search
CPC . H04M 3/5191; H04M 3/2227; H04L 45/302; H04L 45/3065
See application file for complete search history.

(56) References Cited

U.S. PATENT DOCUMENTS

| 8,767,716 B2* | 7/2014 | Trabelsi | H04L 65/1043 370/248 |
| 8,817,722 B2* | 8/2014 | Dwivedi | H04L 1/1816 370/329 |
| 8,830,332 B2* | 9/2014 | Kurose | H04N 21/234327 348/192 |
| 921,563 A1* | 12/2015 | Khay-Ibbat | H04W 36/30 |
| 9,525,992 B2* | 12/2016 | Rao | H04W 8/00 |
| 9,629,187 B1* | 4/2017 | Oroskar | H04W 76/02 |
| 9,788,302 B2* | 10/2017 | Baldwin | H04W 72/005 |

(Continued)

OTHER PUBLICATIONS

Voip-Info.org 2015; Call Center Monitoring.
(Continued)

*Primary Examiner* — Min Jung

(57) ABSTRACT

In one embodiment a system is described, the system including a transceiver disposed at a contact center configured to receive at least one media packet sent during a communication session over a first communication channel, the communication session being established between the contact center and a first party a packet analyzer configured to analyze a quality of the at least one media packet received by the transceiver and a processor configured to determine a routing plan for the at least one media packet, the routing plan depending on the analyzed quality of the at least one media packet, wherein if the quality of the at least one media packet exceeds an acceptability threshold, then the routing plan comprises the processor routing return packets over the first communication channel, and if the quality of the at least one media packet does not exceed the acceptability threshold, then the routing plan comprises the processor taking a corrective action. Related systems, apparatus and methods are also described.

20 Claims, 4 Drawing Sheets

(56) References Cited

U.S. PATENT DOCUMENTS

| | | | |
|---|---|---|---|
| 2006/0203976 A1* | 9/2006 | Erhart | H04M 3/2227 379/88.01 |
| 2014/0269674 A1* | 9/2014 | Meghani | H04L 65/4015 370/352 |
| 2016/0227191 A1* | 8/2016 | Rabii | H04W 24/08 |
| 2016/0301727 A1* | 10/2016 | Barjonas | H04N 7/147 |
| 2017/0279959 A1* | 9/2017 | Karimi-Cherkandi | G10L 25/69 |

OTHER PUBLICATIONS

Cisco Systems, Inc.; Cisco Video Quality Monitoring Configuration Guide (Jul. 30, 2013).
Empirix OneSight 2015; Contact Center Monitoring—Can be found on the world wide web at: http://www.empirix.com/solutions/products-services/contact-center-monitoring.aspx.
Voip Monitor; Voip Monitor (2015) Can be seen at: http://www.voipmonitor.org/.

\* cited by examiner

QUALITY ANALYSIS OF MEDIA AT CONTACT CENTERS

FIELD OF THE INVENTION

The present invention generally relates to customer support contact center communication systems.

BACKGROUND OF THE INVENTION

A customer might attempt to contact a contact center in order to get support over a variety of different modes: voice, video, voice-over-IP (VoIP) calls, chat, and so forth. Distortion of sound causing a negative effect affecting telephone calls and other communication channels is a known problem. This problem might, for instance, lead to voice disruptions and unclear conversations when customers attempt to contact customer service contact centers. Disruptions, sound and video distortions, and other causes for unclear conversations may cause an unpleasant experience for both a customer and for an agent handling a customer support service call. While customer calls are of high importance, it is equally important to make effective utilization of agent's time. Agent's time is typically better utilized handling calls that have a good voice and/or video quality rather than having the agents communicate with customers when communication quality produces distortions and disruptions.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A system and method is described, the system including a transceiver disposed at a contact center configured to receive at least one media packet sent during a communication session over a first communication channel, the communication session being established between the contact center and a first party a packet analyzer configured to analyze a quality of the at least one media packet received by the transceiver and a processor configured to determine a routing plan for the at least one media packet, the routing plan depending on the analyzed quality of the at least one media packet, wherein if the quality of the at least one media packet exceeds an acceptability threshold, then the routing plan comprises the processor routing return packets over the first communication channel, and if the quality of the at least one media packet does not exceed the acceptability threshold, then the routing plan comprises the processor taking a corrective action. Related systems, apparatus and methods are also described.

Discussion of Exemplary Embodiments

Figure 1:
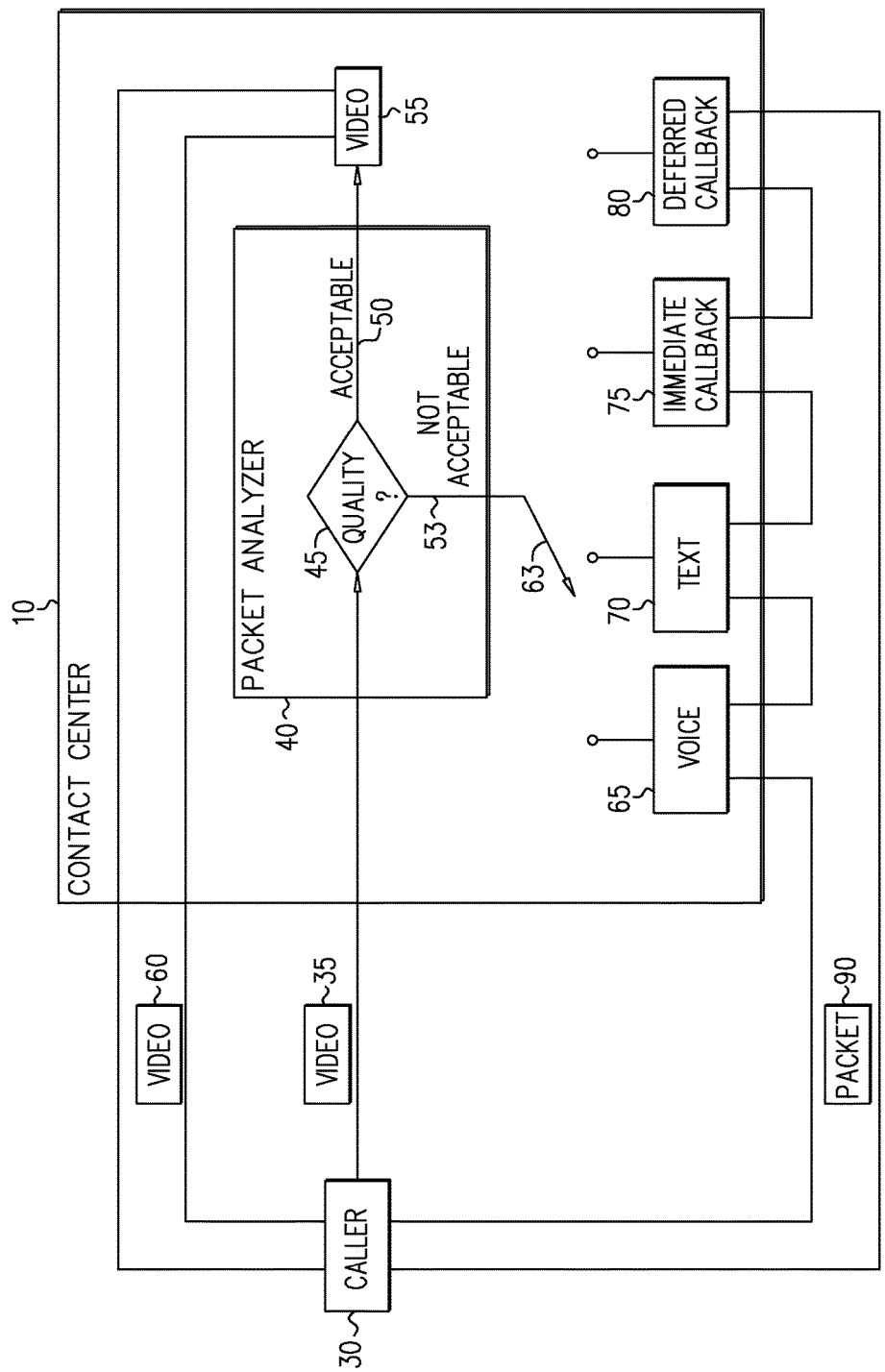
FIG. 1 is a simplified partly block diagram partly flow chart illustration of a system for routing incoming calls to an omnichannel customer service contact center, the system constructed and operative in accordance with an embodiment of the present invention.

Reference is now made to FIG. 1, which is a simplified partly block diagram partly flow chart illustration of a system 10 for routing incoming calls to an omnichannel customer service contact center 20, the system 10 constructed and operative in accordance with an embodiment of the present invention. It is appreciated that references to a "call" (or "calls") throughout the present disclosure, without any clarification of call type—i.e. video call, voice call, etc., is understood to refer to any appropriate method of communication, typically initiated by a caller 30 to the omnichannel customer service contact center 20. By way of example, a "call" might be a video call, a call using voice-over-IP, (VoIP) an online chat, and so forth. The term "omnichannel" in all of its grammatical forms, as used in the present specification and claims, refers to a system having the capability of using a multiplicity of paths of communication. Thus, the omnichannel customer service contact center 20 supports more than one of:

- using a voice communication channel between the omnichannel customer service contact center 20 and the caller 30;
- using a video communication channel between the omnichannel customer service contact center 20 and the caller 30;
- using a chat or other messaging channel between the omnichannel customer service contact center 20 and the caller 30; and
- using any other appropriate communication channel between the omnichannel customer service contact center 20 and the caller 30.

Interactive voice response (IVR) allows a computer, such as a computer (not depicted) located at the omnichannel customer service contact center 20, to interact with human callers' devices i.e., a first party (e.g. the caller 30) through the use of voice and/or dual-tone multi-frequency signaling (DTMF) tones input via a physical or virtual telephone keypad. In telecommunications, IVR allows the caller 30 to interact with the omnichannel customer service contact center 20 via the physical or virtual telephone keypad or by speech recognition, by which the caller 30 can service their own inquiries by following the IVR dialogue. In cases requiring greater levels of support, the caller 30 might be routed to a customer service agent associated with the omnichannel customer service contact center 20. IVR systems can respond with prerecorded or dynamically generated audio to provide further directions as to how to proceed. IVR applications can be used to control most functions where the interface to those functions can be broken down into a series of simple interactions. Typically, IVR systems deployed in the omnichannel customer service contact center 20 are sized to handle large call volumes.

The increased usage of the Internet, and particularly IP based communications protocols, in telecommunications has affected how IVR is used. Point-to-point communications are no longer restricted to voice calls but can now be extended to multimedia technologies such as video. IVR manufacturers have, accordingly, extended their systems into IVVR (interactive voice and video response), especially for mobile phone networks. The use of video gives IVR systems the ability to implement multimodal interaction with the caller 30; that is to say that service calls may occur over a variety of different media channels, including, but not limited to voice, video, text, and so forth. The case of a voice call being answered by the omnichannel customer service contact center 20 in which an IVVR is implemented is discussed below in FIG. 2 as another embodiment of the system 10 of FIG. 1.

By way of example, the caller 30 may initiate a video call with the omnichannel customer service contact center 20. There are many well-known and commercially available tools for using initiating a video call which are well known to persons of skill in the art. The caller 30 will typically call the omnichannel customer service contact center 20 using a device (not depicted), such as a computer with at least one of a built in or an external video camera; alternatively, a cell phone comprising a video camera; or any other appropriate device. The device used by the caller 30 will, in such a case, send video packets to the omnichannel customer service contact center 20. The communication interface (not depicted) typically comprises a combination of hardware and software, as is known in the art, will route the video packets 35 to a packet analyzer 40. It is appreciated that the packet analyzer 40 comprises a video packet analyzer in the present example. Other appropriate packet analyzers will be utilized by the omnichannel customer service contact center 20 for other appropriate packet types.

It is appreciated that if the caller 30 uses the device to initiate a call using text messaging, live chat, or voice, then the device will send packets of the appropriate media type to the omnichannel customer service contact center 20. It should be appreciated that all of the steps of the following description may be applied, mutatis mutandis, to these various media types. As was noted above, the special case of voice or VoIP interacting with an IVVR at the omnichannel customer service contact center 20 will be dealt with below, with reference to FIG. 2.

Video packets 35 are received by an appropriate communication interface (not depicted) at the omnichannel customer service contact center 20.

The packet analyzer 40 will perform an analysis of the quality of the received video packets 35 (typically more than one packet is used to determine packet quality). Many commercial and open source packet quality analyzers for various types of media are known in the art. By way of example, the VoIP Monitor, found at www.voipmonitor.org, is an open source network packet sniffer with commercial frontend for various VoIP protocols. VoIP Monitor is designed to analyze quality of VoIP call based on network parameters—delay variation and packet loss in order to predict call quality. Similarly, the Cisco™ Video Quality Monitoring (VQM) module provides monitoring of the quality of the video calls delivered over a network, utilizing a set of video quality metrics for calls with a H.264 codec (which is described at:www.cisco.com/c/en/us/td/docs/routers/access/ISRG2/VQM/configuration/guide/VQM_guide.pdf).

Should the packet analyzer 40 determine that the quality of the received video packets 35 is above an acceptable threshold 50, then the received packets (in this case, video packets 35) will be routed to an appropriate video call channel where the video service call 55 be then be handled by a omnichannel customer service contact center 20 agent. Outgoing video packets, indicated by block 60 will, as part of the video call session, be routed through the video call channel to the caller's 30 device (not depicted).

On the other hand, if the packet analyzer determines that the quality of the received packets 45 is below an acceptable threshold 53, then a processor (such as processor 240 in FIG. 3, described below) will take a corrective action. By way of example, the processor may, as a corrective action, implement a routing plan wherein the video call is routed to a different media type (e.g., voice or chat), using a method discussed below. Alternatively, the processor may send an administrative message to the caller device 30 causing an on-screen display (OSD) to be displayed on the screen of the caller's 30 device, in order to inform the caller 30 that the video quality is a lower than optimal quality. The OSD may contain a recommendation that the caller try to contact the omnichannel customer service contact center 20 at a later time or from a location with better signal quality.

The following is one possible set of instructions (pseudo-code) at a very high level, which might be used by the processor (such as processor 240, described below in the discussion of FIG. 3) to determine a proposed alternative routing plan as a method of routing the caller's 30 contact with the omnichannel customer service contact center 20:

1. List supported Media types in the Contact Center environment(Ex: Voice, Video, VOIP, Chat..).
2. Repeat {
   2.1 Incoming call on a specific voice or video media channel
   2.2 Analyze type of media
   2.3 Analyze media packets
       2.3.1       If Media packet quality is lesser than Desired level
           2.3.1.1       Goto ProposeAlternateMedia
       2.3.2       Else
           2.3.2.1       Continue with Media type
3. ProposeAlternateMedia function
   3.1 If MediaType is Video
       3.1.1       Propose Alternate Media such as voice or chat(based on available media type) or suggest call back.
   3.2 If MediaType is Voice
       3.2.1       Propose Alternate Media such as Video or Voip or chat (based on available media type) or suggest call back.
   3.3 Else
       3.3.1       Suggest continuing with the same media, however indicate customer of a possible unpleasant conversation.

The processor may send an administrative message to the caller device 30 causing an on-screen display (OSD) to be displayed on the screen of the caller's 30 device in order to inform the caller that the call will be continued over an alternative medium. Note that continuing the call over an alternative medium presupposes that such an alternative medium is available at that time to handle the call. Accordingly, FIG. 1 indicates with switch 63 that a variety of options may be selected. For example, the video call may be terminated, and the omnichannel customer service contact center 20 may initiate a new call, this time a voice call 65, or a text call 70. In another embodiment the omnichannel customer service contact center 20 may initiate an immediate call back 75 to the caller 30 using the same medium, i.e. video. In still another embodiment, the omnichannel customer service contact center 20 may initiate a deferred call back 80 to the caller 30 (for example, the omnichannel customer service contact center 20 may call the caller 30 back in an hour or some other appropriate amount of time). In yet another alternative embodiment, the omnichannel customer service contact center 20 may provide the customer with an option to be contacted either by sending the caller 30 an OSD, a text message, or through some other appropriate medium. Such a contact may either be by video or by some other medium at a later time. In all of these options, at least one packet 90 of an appropriate packet type (e.g. voice, text, etc.) will be sent by the omnichannel customer service contact center 20 to the caller's 30 device (depicted as moving through a communication channel). Alternatively, the call may proceed over the low quality channel in spite of the low quality.

Figure 2:
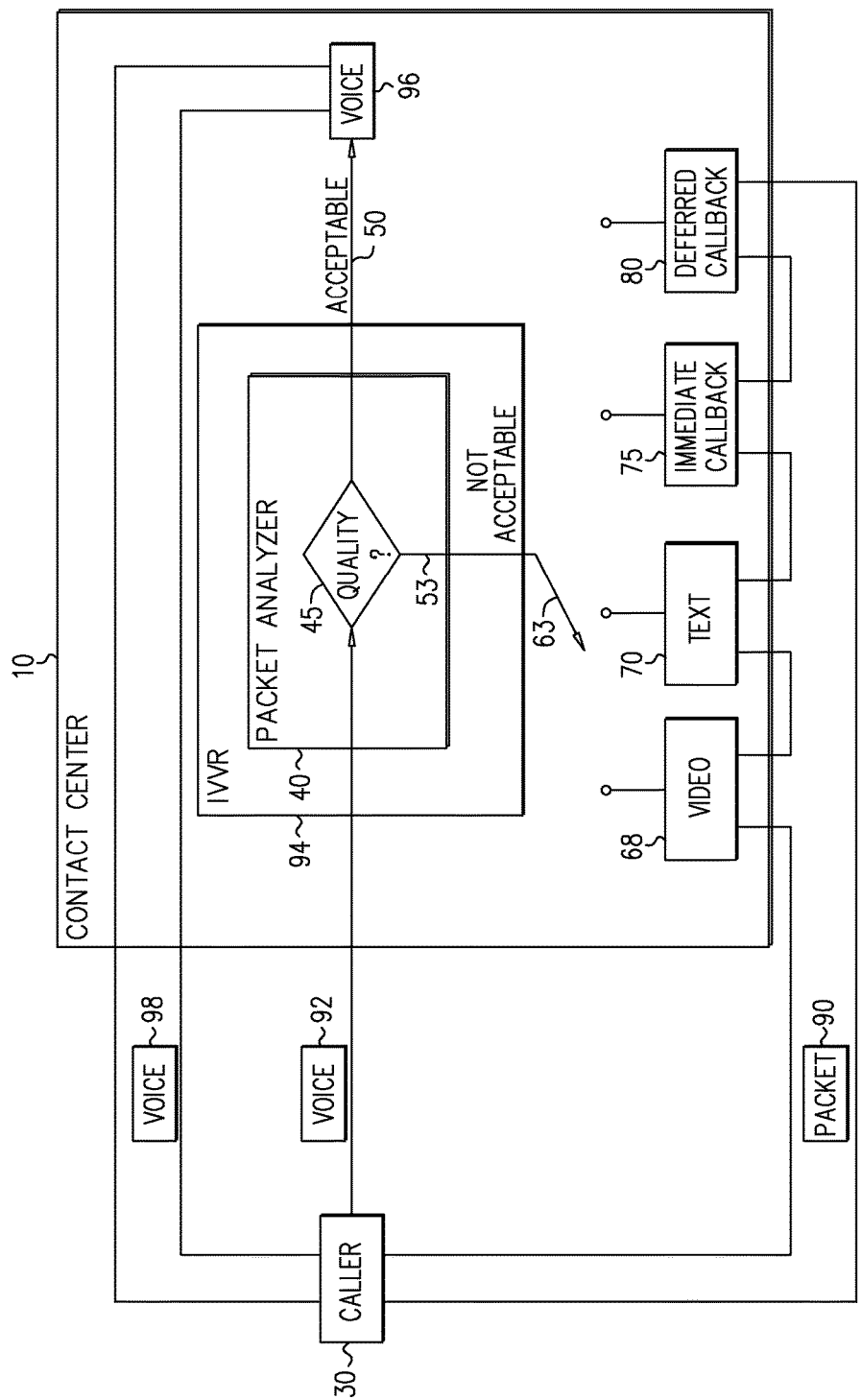
FIG. 2 is a simplified partly block diagram partly flow chart view of an alternative embodiment the system of FIG. 1 in which an interactive voice and video response (IVVR) system is implemented for voice calls.

Reference is now made to FIG. 2, which is a simplified partly block diagram partly flow chart view of an alternative embodiment of the system of FIG. 1 where an interactive voice and video response (IVVR) system is implemented for voice calls. The example of the system 10 of FIG. 2 is substantially similar to the example given above used to describe the system 10 of FIG. 1. It is appreciated that the system 10 of FIGS. 1 and 2 is the same system 10. The difference between FIGS. 1 and 2 is the use of voice as the medium of contact by the caller 30, and the use of an IVVR 94 in the omnichannel customer service contact center 20.

Specifically, the caller 30 initiates a voice (or VoIP) call, sending voice packets 92 (or IP packets for VoIP) to the omnichannel customer service contact center 20. The voice or VoIP packets are received at the IVVR 94, which comprises the packet analyzer 40. Should the packet analyzer 40 determine that the quality of the received packets 45 is acceptable 50, then the received packets, in this case, voice or VoIP packets will be routed to an appropriate voice or VoIP call channel where the voice or VoIP service call 96 be then be handled by a omnichannel customer service contact center 20 agent. Outgoing voice or VoIP packets 98 will, as part of the video call session, be routed through the video call channel to the caller's 30 device (not depicted).

On the other hand, if the packet analyzer determines that the quality of the received packets 45 is not acceptable 53, then a processor (such as processor 240 in FIG. 3, described below) will take a corrective action, as described above, with reference to FIG. 1. For example, the voice call may be terminated, and the omnichannel customer service contact center 20 may initiate a new call, this time a video call 68, or a text call 70.

Figure 3:
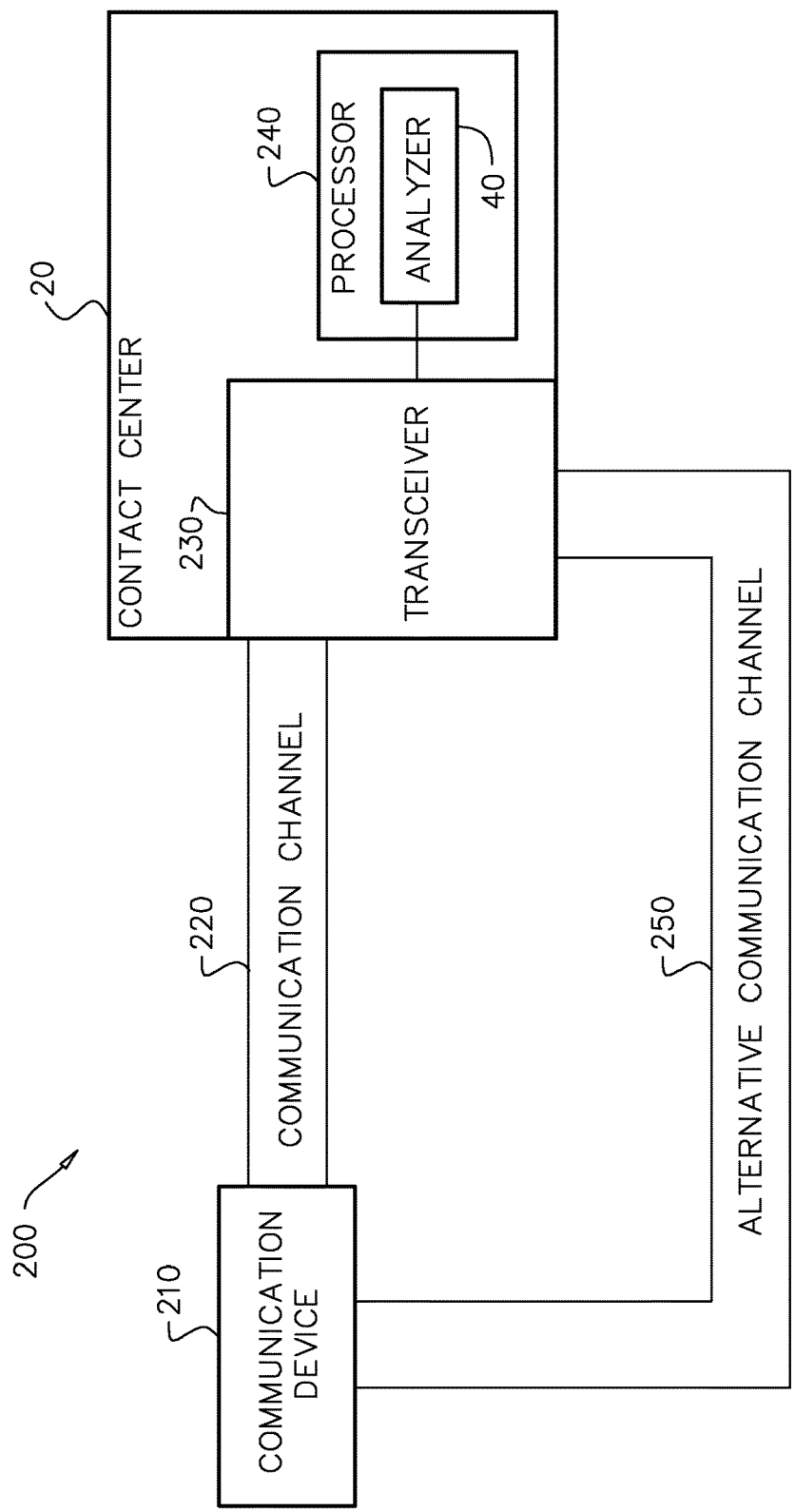
FIG. 3 is a view of a particular alternative embodiment of the system of FIG. 1.

Reference is now made to FIG. 3, which is a view of a particular alternative embodiment of the system 10 of FIGS. 1 and 2. FIG. 3 provides a view of the system 10 of FIGS. 1 and 2 from an operations standpoint. The system 200 as described in FIG. 3 comprises a client side communication device 210. The client side communication device 210 uses a first communication channel 220 to initiate a communication session with the omnichannel customer service contact center 20. The first communication channel 220 is input into a communication packet transceiver 230, typically specialized hardware and software which receives packets which have been sent over a communication network channel, including, by way of example, but not limited to Ethernet, SS7, or any other appropriate communication protocol, as is known in the art. (Note that SS7, Signaling System Number 7, may refer to any of the localized versions of SS7, which may include CCSS7 (in North America), C7 (in the UK), N7 (in Germany), or any one of a number of other names associated with this protocol.) The communication packet transceiver 230 receives the communications packets sent over the first communications channel 220, and forwards the communications packets to a processor 240.

The processor 240 comprises the packet analyzer 40 described above, with reference to FIG. 1, where an exemplary routine for execution by the processor 240 is described. The operation of the packet analyzer 40 was described above. As a result of the analysis of the packet analyzer 40, the processor 240 will either route return packets to the client side communication device 210 over the first communication channel 220, replying maintaining the original type of communication, or alternatively, the processor 240 will route return packets to the client side communication device 210 over a second (alternative) communication channel 250, replying and changing the original type of communication. One exemplary mechanism by which the processor 240 might determine an alternative mechanism over which to contact the client is provided in the pseudo-code listing provided above. It is assumed that the contact center 20 comprises a data base with alternative contact information (e.g., alternative phone numbers, VoIP system identifiers, and so forth) for use in establishing the second (i.e. alternative) communication channel 250. It is appreciated that, the communication over the second communication channel 250 may comprise a notice that communication over the first communication channel 220 will resume at a more appropriate time, as discussed above.

Figure 4:
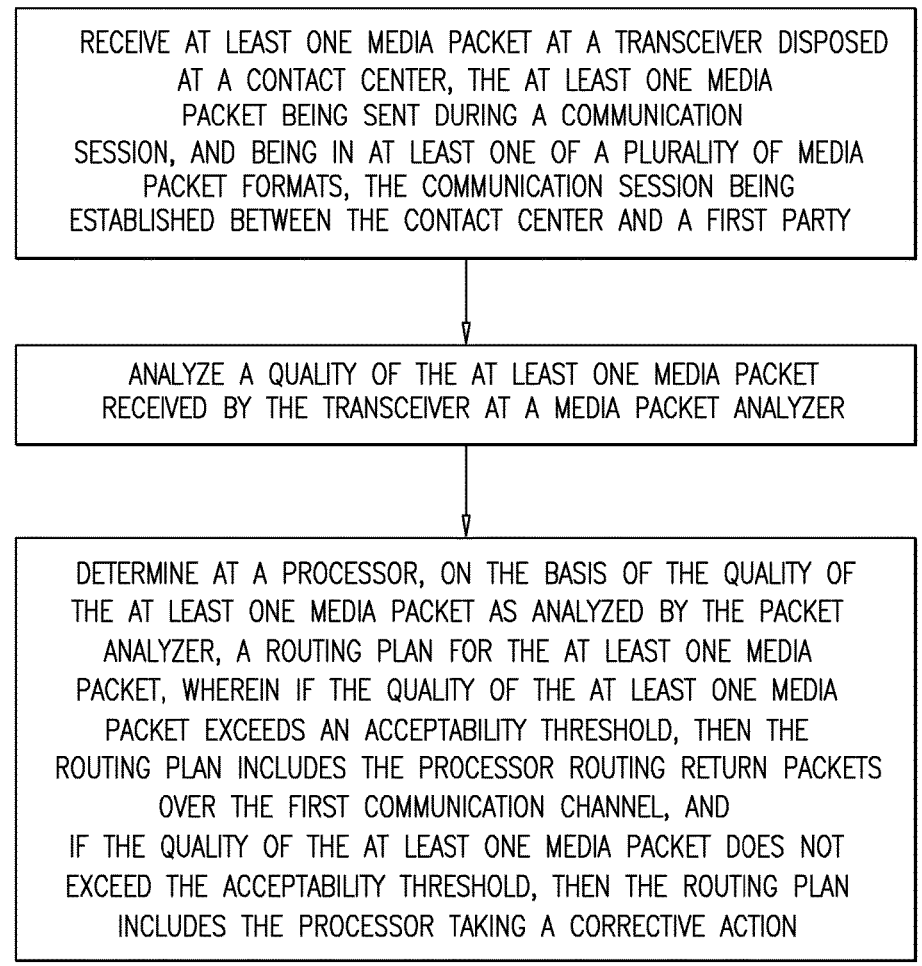
FIG. 4 is a flowchart of an exemplary method for implementing the system of FIG. 1.

Reference is now made to FIG. 4, which is a simplified flow chart of one embodiment described herein. The method of FIG. 4 is believed to be self-explanatory with reference to the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A system comprising:
   a transceiver disposed at a contact center configured to receive at least one media packet having a first media type sent during a communication session over a first communication channel, the communication session being established between the contact center and a first party;
   a packet analyzer configured to analyze a quality of the at least one media packet received by the transceiver; and
   a processor configured to determine, based on the analyzed quality of the at least one media packet, one of:
      to continue the communication session over the first communication channel with the first media type if the quality of the at least one media packet exceeds an acceptability threshold; or
      to take corrective action if the quality of the at least one media packet does not exceed the acceptability threshold, the corrective action including replying to the first party via a second communication channel to propose an alternative second media type that differs from the first media type.

2. The system of claim 1 wherein the at least one media packet is one of: an IP voice packet; an IP video packet; and a text based packet.

3. The system of claim 1 wherein the corrective action further comprises diverting the communication session from the first communication channel to the second communication channel.

4. The system of claim 3 wherein a type of media borne by the second communication channel comprises the alternative second media.

5. The system of claim 1 wherein the corrective action further comprises causing a displaying an on screen display (OSD) on a first party communication device.

6. The system according to claim 5 wherein the OSD comprises a message suggesting that the first party contact the contact center at a later time.

7. The system according to claim 5 wherein the OSD comprises a message suggesting that the first party contact the contact center from a different location.

8. A method comprising:
receiving at least one media packet having a first media type at a transceiver disposed at a contact center, at least one media packet being sent during a communication session, the communication session being established between the contact center and a first party;
analyzing a quality of the at least one media packet received by the transceiver at a media packet analyzer; and
determining at a processor, on the basis of the quality of the at least one media packet as analyzed by the packet analyzer, to perform one of the following:
continuing the communication session over the first communication channel with the first media type if the quality of the at least one media packet exceeds a acceptability threshold; or
taking a corrective action if the quality of the at least one media packet does not exceed the acceptability threshold, the corrective action including replying to the first party via a second communication channel to propose an alternative second media type that differs from the first media type.

9. The method of claim 8 wherein the at least one media packet is one of: an IP voice packet; an IP video packet; and a text based packet.

10. The method of claim 8 wherein the corrective action further comprises diverting the communication session from the first communication channel to the second communication channel.

11. The method of claim 10 wherein a type of media borne by the second communication channel comprises the alternative second media.

12. The method of claim 8 wherein the corrective action further comprises causing a displaying an on screen display (OSD) on a first party communication device.

13. The method according to claim 12 wherein the OSD comprises a message suggesting that the first party contact the contact center at a later time.

14. The method according to claim 12 wherein the OSD comprises a message suggesting that the first party contact the contact center from a different location.

15. A computer-readable medium including contents that are configured to cause a computing system to sort data by performing a method comprising:
receiving at least one media packet having a first media type at a transceiver, the transceiver being disposed at a contact center, the at least one media packet being sent during a communication session, the communication session being established between the contact center and a first party;
analyzing a quality of the at least one media packet received by the transceiver at a media packet analyzer; and
determining at a processor, on the basis of the quality of the at least one media packet as analyzed by the packet analyzer, to perform one of the following:
continuing the communication session over the first communication channel with the first media type if the quality of the at least one media packet exceeds an acceptability threshold; or
taking a corrective action if the quality of the at least one media packet does not exceed the acceptability threshold, the corrective action including replying to the first party via a second communication channel to propose an alternative second media type that differs from the first media type.

16. The computer-readable medium of claim 15, wherein the at least one media packet is one of: an IP voice packet; an IP video packet; and a text based packet.

17. The computer-readable medium of claim 15, wherein the corrective action further comprises causing displaying an on screen display (OSD) on a first party communication device.

18. The computer-readable medium of claim 17, wherein the OSD comprises a message suggesting that the first party contact the contact center at a later time.

19. The computer-readable medium of claim 17, wherein the OSD comprises a message suggesting that the first party contact the contact center from a different location.

20. The computer-readable medium of claim 17, wherein the corrective action further comprises diverting the communication session from the first communication channel to the second communication channel.

* * * * *

UNITED STATES PATENT AND TRADEMARK OFFICE
CERTIFICATE OF CORRECTION

PATENT NO. : 10,154,139 B2
APPLICATION NO. : 14/941694
DATED : December 11, 2018
INVENTOR(S) : Sathish Kumar Sampath et al.

It is certified that error appears in the above-identified patent and that said Letters Patent is hereby corrected as shown below:

In the Claims

Claim 4, Column 7, Line 10, replace "second media." with --second media type.--

Claim 11, Column 7, Line 51, replace "second media." with --second media type.--

Signed and Sealed this
Twenty-second Day of January, 2019

Andrei Iancu
*Director of the United States Patent and Trademark Office*